Aug. 14, 1962  A. S. LUNDY ET AL  3,048,956
PARTICLE AND FLUID COLLECTOR
Filed March 3, 1959  2 Sheets-Sheet 1
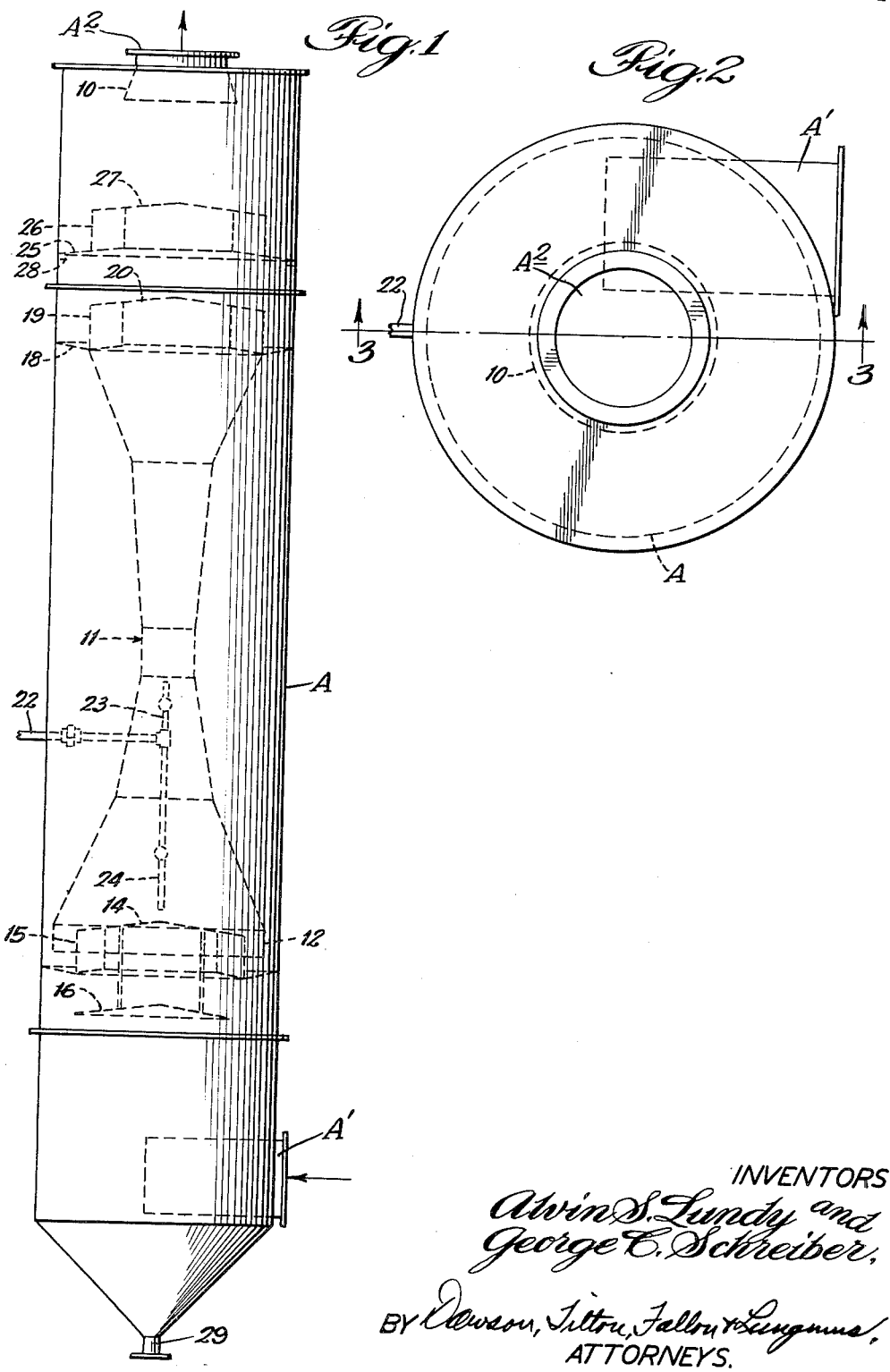
INVENTORS:
Alvin S. Lundy and
George C. Schreiber,
BY Dawson, Tilton, Fallon & Lungmus
ATTORNEYS.

Aug. 14, 1962 A. S. LUNDY ET AL 3,048,956
PARTICLE AND FLUID COLLECTOR
Filed March 3, 1959 2 Sheets-Sheet 2
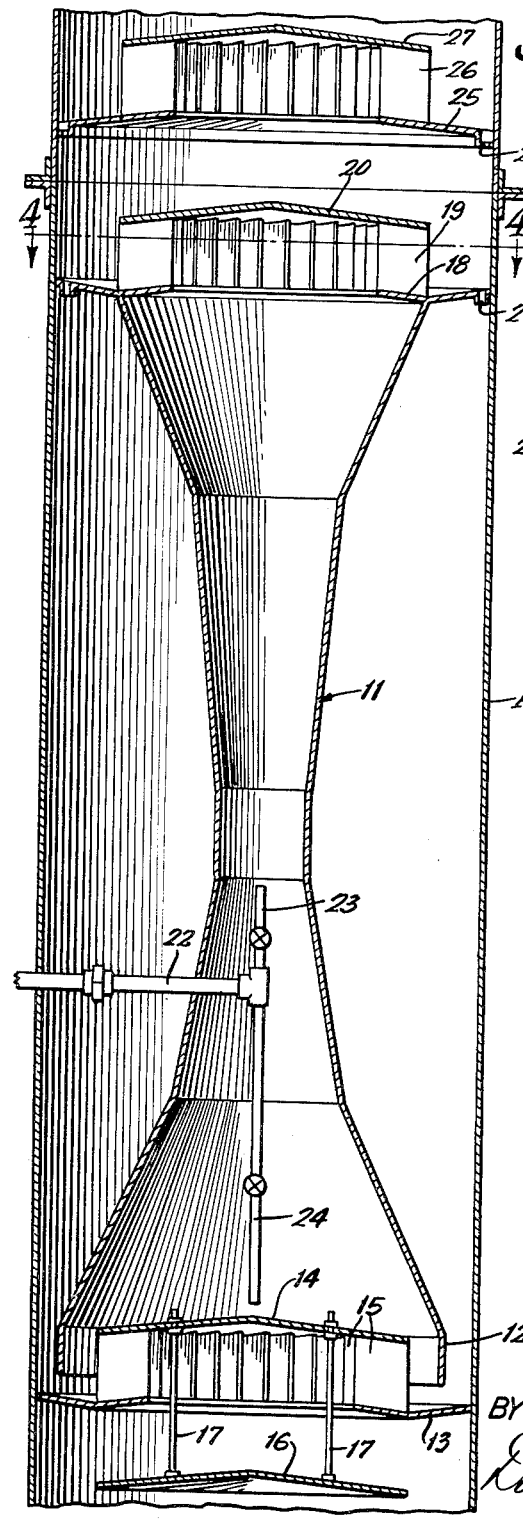
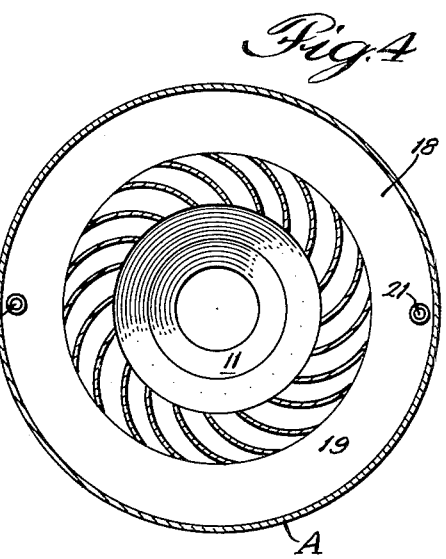
INVENTORS:
Alvin S. Lundy and
George C. Schreiber,
BY
Dawson, Tilton, Fallon & Lungmus,
ATTORNEYS.

United States Patent Office 3,048,956
Patented Aug. 14, 1962

3,048,956
PARTICLE AND FLUID COLLECTOR
Alvin S. Lundy, Bloomfield Hills, and George C. Schreiber, Birmingham, Mich., assignors to Claude B. Schneible Co., Detroit, Mich., a corporation of Michigan
Filed Mar. 3, 1959, Ser. No. 796,961
10 Claims. (Cl. 55—235)

This invention relates to a particle and fluid collector, and more particularly to a collector for the treatment of contaminating gas such as, for example, a dust collector or fume collector, etc.

An object of the present invention is to provide new means for treating a gas stream with liquid while utilizing a spinning gas stream during the liquid mixing and entrainment separating operations. Another object is to provide, in a column for treating contaminated gas, means for spinning the gas stream, aspirating liquid thereinto and greatly increasing the centrifugal force on particles so as to throw them on wet walls, spray droplets, etc., for the effective separation of the particles or fumes from the gas. A still further object is to provide, in combination with means for producing a spinning gas stream at the entrance of a venturi, means for injecting liquid into the gas stream within the venturi, and entrainment separators for the removal of the particles, fumes, etc., or cooling of gases. Yet another object is to provide, in combination with the foregoing, liquid by-pass means from an upper portion of the column to a lower portion and utilizing the downwardly-flowing liquid for controlling the flow of an excessive amount of gas along the outside of the venturi. Other specific objects and advantages will appear as the specification proceeds.

The invention is shown, in an illustrative embodiment, by the accompanying drawings, in which—

FIGURE 1 is a side view in elevation of apparatus embodying our invention; FIG. 2, an enlarged top plan view; FIG. 3, a broken vertical sectional view; and FIG. 4, a transverse detail sectional view, the section being taken as indicated at line 4—4 of FIG. 3.

In the illustration given, A designates a column having a tangential inlet $A^1$. The column is provided at its top with an outlet $A^2$ having a depending skirt indicated by the numeral 10. While the column is shown as a vertical column, it will be understood that the venturi portion of the column may be horizontal and the entrainment section in a separate structure.

Within the column A, as shown best in FIGS. 3 and 4, we provide a venturi casing 11 having an enlarged lower end portion 12, within which are mounted baffles of the plate-and-ring type. The ring is designated by the numeral 13, the plate is designated by the numeral 14, and the vanes are designated by the numeral 15. A deflector or baffle plate 16 may be suspended from plate 14 by the rods 17, as illustrated.

The top of the venturi casing 11 is also flared outwardly to receive the ring 18, which is similar to ring 13 below, and vanes 19 similar to vanes 15 below extend between the ring 18 and an upper plate 20. By-pass tubes 21 or openings are preferably provided for the by-passing of liquid downwardly along casing A, the liquid being directed around the lower enlarged portion 12 of venturi 11 and serving as a means for blocking off the flow of an excessive amount of gas along the outer side of the venturi 11. Such a by-pass structure is shown in greater detail in Schneible Patent No. 2,596,104.

A liquid pipe 22 leads into the casing A and venturi 11 and feeds liquid to the valve-controlled injection pipe 23 from which the liquid is aspirated by the high velocity stream to form a spray that mingles uniformly with the upwardly-flowing, rapidly rotating gas stream. Also liquid is fed through the valve-controlled pipe 24 so as to flow over the plate 14.

Above the plate 20 and spaced therefrom is another series of baffles comprising a ring 25, vanes 26, and a plate 27. The flared skirt 10 of the outlet ring $A^2$ cooperates with the rotating annulus in causing the purified gas to pass through the outlet while collecting the heavier materials along the sides of the column and moving them downwardly through the apparatus. The ring 25 is preferably provided with a liquid by-pass 28.

In the operation of the apparatus described, contaminated gas enters tangentially through the inlet $A^1$ to initiate spinning the gas stream, and the bottom vane stage increase the spinning and removes heavier particles. It will be understood that the entrance of the contaminated gas may be produced by pressure of the incoming air or by suction maintained on the outlet $A^2$. In any event, the incoming gas is caused to spin in the lower part of the apparatus and the rotation is increased by the action of the lower vane stage while the venturi is effective in increasing not only the linear velocity of the gas stream but, due to conservation of energy, greatly increases the spinning of the gas stream so that there is produced great centrifugal force on the particulate matter carried by the gas stream. Such increase of linear velocity and speed of rotation of the gas stream further is combined with the entrainment of liquid through the pipe 23 so as to effect intimate contact between the liquid and the rapidly-rotating gas stream, since the liquid moves from the center of the gas stream outward and is subjected to shear due to gas stream's lineal and radial motion. For example, dust particles are wetted and thrown on the wet walls of the venturi and on spray droplets. The upper vane stage 19 collects the spray and carry-over of particles, while the entrainment separator vanes 26 remove the liquid droplets from the gas stream.

In the foregoing operation, the combination of the vane stages with the venturi and the liquid pipes is found to increase not merely the linear velocity of the gas stream but the rotation of the gas stream which had been initiated by the tangential inlet and the lower vane stage. The increase of rotation of the stream cooperates with the aspirated liquid in rapidly wetting particles, etc. so as to increase the centrifugal effect and with the result that the particles are thrown to the wet walls of the venturi casing and are washed downwardly to the bottom of the column, where they may be withdrawn through outlet 29. By reason of the high velocity through the venturi, it is necessary to provide the liquid by-passes 21. To prevent an excessive amount of gas flowing up the outside of the venturi, the opening through the bottom of the venturi and the ring 13 is kept small, and a considerable portion of this opening will be blocked off by liquid on the shelf plate.

While, in the foregoing specifications, we have set forth a specific structure in considerable detail for the purpose of illustrating an embodiment of our invention, it will be understood that such details may be varied widely by those skilled in the art without departing from the spirit of our invention.

We claim:

1. In a column for the intimate contact of gas with a liquid, a casing providing a generally vertical chamber provided at one end with an outlet and near its other end with a tangential inlet for rotating the incoming gas, means for passing gases through the chamber from the inlet to the outlet, an inner casing within said first-mentioned casing and spaced from said inlet and outlet, said inner casing having flared end portions and a constricted intermediate portion providing a venturi passage, a liquid conduit within said constricted portion adapted to discharge liquid within said venturi passage, and means at the flared inlet to said inner casing for continuing the rotation of the gases entering said inner casing.

2. The apparatus of claim 1 in which the flared outlet of said inner casing is also provided with impingement baffles for continuing the rotation of said gases and providing additional contact surface.

3. The apparatus of claim 1 in which baffle means is provided between the flared outlet of said inner casing and the outlet of said outer casing and at a spaced distance from the inner casing outlet.

4. In a column for the intimate contact of gases with a liquid, a casing providing a vertical chamber provided at its top with an outlet and at its bottom with an outlet, means for introducing gases into the lower portion of said chamber to rotate the same therein, an inner casing within said first-mentioned casing and spaced from the outlets thereof, said inner casing having flared end portions and a constricted intermediate portion providing a venturi passage having its inlet at the bottom and outlet at the top, a liquid conduit within said inner casing and having a centrally located discharge opening adjacent said constricted portion and facing toward said outlet, a baffle mounted within the lower inlet portion of said inner casing for rotating the gases entering said inner casing, a second baffle at the flared outlet portion of said inner casing for continuing the rotation of said gases, and by-pass means permitting the flow of liquid from the upper baffle to the lower baffle outside of said inner casing.

5. The structure of claim 4 in which intermediate baffle means is provided between said second-mentioned baffle and the outlet of the outer casing.

6. In a column for the treatment of contaminated air with a liquid, a casing providing a vertical chamber provided at its top with an outlet and at its bottom with an outlet, said chamber having a tangential inlet adjacent its bottom, means for passing gases through said inlet and through said chamber, an inner casing within said first-mentioned casing and spaced from said outlets, said inner casing having flared end portions and a constricted intermediate portion providing a venturi passage, means for supplying liquid to said inner casing within said venturi passage, means associated with the lower flared end of said inner casing for rotating the gases entering said casing, and baffle means between the flared outlet of said inner casing and the outlet of said outer casing.

7. The structure of claim 6 in which the outlet of said first-mentioned casing comprises a tube having an inner, inwardly-extending, flared inlet.

8. The structure of claim 6 in which the means for introducing water into the venturi passage includes a vertical tube having an upwardly-extending discharge portion for directing liquid into the passage portion of smallest cross section and having a downwardly-extending discharge portion for directing liquid upon the baffle means therebelow.

9. The structure of claim 8 in which valve means are provided for controlling the flow of liquid through the discharge ends of said tube.

10. In a column for the treatment of a gas containing particulate matter, a casing providing a vertical chamber provided at its top with an outlet and at its bottom with an outlet, said casing having also adjacent its bottom a tangential inlet, means for passing gases through said inlet and through said chamber, an inner casing within said first-mentioned casing and spaced from said outlets, said inner casing having flared end portions and a constricted intermediate portion providing a venturi passage, means for supplying liquid into the interior of said venturi passage, and baffle means associated with the lower flared portion of said inner casing for rotating the gases entering said inner casing and approaching the constricted portion of said passage.

References Cited in the file of this patent
UNITED STATES PATENTS

| | | |
|---|---|---|
| 757,757 | Luhne | Apr. 19, 1904 |
| 968,332 | Dow | Aug. 23, 1910 |
| 1,264,263 | Brassert | Apr. 30, 1918 |
| 1,841,556 | Stelz | Jan. 19, 1932 |
| 1,894,744 | Hawley | Jan. 17, 1933 |
| 1,927,073 | Ruehl | Sept. 19, 1933 |
| 2,191,864 | Schaefer | Feb. 27, 1940 |
| 2,217,130 | Niehart | Oct. 8, 1940 |
| 2,337,983 | Fisher | Dec. 28, 1943 |
| 2,409,088 | Weits | Oct. 8, 1946 |
| 2,596,106 | Schneible | May 13, 1952 |
| 2,852,239 | Vicard | Sept. 16, 1958 |